United States Patent
Yu et al.

(10) Patent No.: US 10,278,234 B2
(45) Date of Patent: Apr. 30, 2019

(54) METHOD, TERMINAL AND SYSTEM FOR REDUCING POWER CONSUMPTION OF CLUSTER TERMINAL IN BROADBAND CLUSTER SYSTEM

(71) Applicant: Hytera Communications Corporation Limited, Shenzhen, Guangdong (CN)

(72) Inventors: Qingxiang Yu, Guangdong (CN); Jiasheng Zeng, Guangdong (CN)

(73) Assignee: Hytera Communications Corporation Limited, Shenzhen, Guangdong (CN)

( * ) Notice: Subject to any disclaimer, the term of this patent is extended or adjusted under 35 U.S.C. 154(b) by 0 days.

(21) Appl. No.: 15/738,291

(22) PCT Filed: Jun. 24, 2015

(86) PCT No.: PCT/CN2015/082204
§ 371 (c)(1),
(2) Date: Dec. 20, 2017

(87) PCT Pub. No.: WO2016/206016
PCT Pub. Date: Dec. 29, 2016

(65) Prior Publication Data
US 2018/0176982 A1 Jun. 21, 2018

(51) Int. Cl.
*H04W 84/04* (2009.01)
*H04W 84/08* (2009.01)
(Continued)

(52) U.S. Cl.
CPC ......... *H04W 84/04* (2013.01); *H04W 68/005* (2013.01); *H04W 68/025* (2013.01);
(Continued)

(58) Field of Classification Search
CPC ............. H04W 76/28; H04W 52/0225; H04W 68/025; H04W 52/34; H04W 52/023;
(Continued)

(56) References Cited

U.S. PATENT DOCUMENTS

| 10,085,207 B2 | 9/2018 | Chou et al. |
| 2008/0081645 A1* | 4/2008 | Kim .................... H04W 68/025 455/458 |

(Continued)

FOREIGN PATENT DOCUMENTS

| CN | 1852494 A | 10/2006 |
| CN | 102036347 A | 4/2011 |

(Continued)

OTHER PUBLICATIONS

Australian Office Communication dated Jun. 29, 2018 in connection with Application No. 2015399593.

(Continued)

*Primary Examiner* — Keith Ferguson
(74) *Attorney, Agent, or Firm* — Wolf, Greenfield & Sacks, P.C.

(57) ABSTRACT

Provided are a method, terminal and system for reducing power consumption of a cluster terminal in a broadband cluster system. The method includes: receiving, by the cluster terminal, a group call configuration instruction transmitted by a base station; configuring a group call context, a discontinuous reception instruction and group call resources by the cluster terminal based on the group call configuration instruction; and executing the discontinuous reception instruction by the cluster terminal; sensing a physical channel by the cluster terminal when it is determined that an active phase of the discontinuous reception instruction is entered; and stopping sensing the physical channel by the cluster terminal when it is determined that a dormant phase of the discontinuous reception instruction is entered.

3 Claims, 4 Drawing Sheets

(51) Int. Cl.
*H04W 76/20* (2018.01)
*H04W 68/00* (2009.01)
*H04W 68/02* (2009.01)
*H04W 76/27* (2018.01)
*H04W 76/28* (2018.01)

(52) U.S. Cl.
CPC ........... *H04W 76/20* (2018.02); *H04W 76/27* (2018.02); *H04W 76/28* (2018.02); *H04W 84/08* (2013.01); *Y02D 70/126* (2018.01); *Y02D 70/24* (2018.01)

(58) Field of Classification Search
CPC ............... H04W 52/028; H04W 76/20; H04W 28/0221; H04W 36/36; H04W 52/02; H04W 52/0274; H04W 84/08
See application file for complete search history.

(56) References Cited

U.S. PATENT DOCUMENTS

| | | | | |
|---|---|---|---|---|
| 2009/0010213 A1* | 1/2009 | Yamada | ............... | H04B 1/7143 370/329 |
| 2009/0316603 A1 | 12/2009 | Amerga et al. | | |
| 2010/0124208 A1 | 5/2010 | Sato | | |
| 2012/0257530 A1 | 10/2012 | Bijwaard et al. | | |
| 2013/0250771 A1* | 9/2013 | Yu | ......................... | H04W 76/14 370/241 |
| 2015/0131505 A1 | 5/2015 | Dai | | |
| 2015/0173039 A1 | 6/2015 | Rune et al. | | |
| 2016/0119762 A1 | 4/2016 | Zhu et al. | | |
| 2016/0309412 A1 | 10/2016 | Choi et al. | | |
| 2017/0347346 A1* | 11/2017 | Anderson | ............. | H04W 76/38 |

FOREIGN PATENT DOCUMENTS

| | | | |
|---|---|---|---|
| CN | 102413587 A | 4/2012 | |
| CN | 102625254 A | 8/2012 | |
| CN | 104350795 A | 2/2015 | |
| RU | 2 592 888 C2 | 7/2016 | |
| RU | 2018102248/08 | 1/2019 | |
| WO | WO 2008/155739 A2 | 12/2008 | |
| WO | WO 2010/008844 A1 | 1/2010 | |
| WO | WO 2011/053146 | 5/2011 | |
| WO | WO 2013/166953 A1 | 11/2013 | |
| WO | WO 2014/183279 A1 | 11/2014 | |
| WO | WO 2015/041464 | 3/2015 | |

OTHER PUBLICATIONS

Extended European Search Report for Application No. EP 15895916.3 dated May 2, 2018.

[No Author Listed], 3$^{rd}$ Generation Partnership Project; Technical Specification Group Services and System Aspects; Study on architecture enhancements to support Group Communication System Enablers for LTE (GCSE_LTE) (Release 12). 3GPP Organizational Partners. Retrieved from internet Aug. 18, 2014. 64 pages. <http://www.3gpp.org/ftp/tsg_sa_WG2_Arch/Latest_SA2_Specs/Rel-12/>.

[No Author Listed], 3$^{rd}$ Generation Partnership Project; Technical Specification Group Radio Access Network; Evolved Universal Terrestrial Radio Access (E-UTRA); Medium Access Control (MAC) protocol specification (Release 12). 3GPP Organizational Partners. Retrieved from internet Jun. 22, 2015. 78 pages. <http://www.3gpp.org/ftp/tsg_ran/WG2_RL2/Specifications/201506_draft_specs_after_Ran_68/>.

International Search Report and Written Opinion for Application No. PCT/CN2015/082204 dated Mar. 25, 2016.

Office Action for Russian Application No. 2018102248/08(003040), dated Jan. 14, 2019.

Office Action for Chinese Application No. 201580000294.0, dated Mar. 4, 2019.

Lihong, LTE/LTE-A system nased DRX algorithm study. Wuhan University of Technology, Apr. 2014, 4 pages.

* cited by examiner

METHOD, TERMINAL AND SYSTEM FOR REDUCING POWER CONSUMPTION OF CLUSTER TERMINAL IN BROADBAND CLUSTER SYSTEM

CROSS-REFERENCE TO RELATED APPLICATIONS

The present application is the national phase of International Patent Application No. PCT/CN2015/082204, titled "METHOD, TERMINAL AND SYSTEM FOR REDUCING POWER CONSUMPTION OF CLUSTER TERMINAL IN BROADBAND CLUSTER SYSTEM", filed on Jun. 24, 2015, which is incorporated herein by reference in its entirety.

FIELD

The present disclosure relates to the technical field of communications, and particularly to a method, a terminal and a system for reducing power consumption of a cluster terminal in a broadband cluster system.

BACKGROUND

With a growing requirement for carrying mobile services such as voice, video and positioning on a network, a broadband cluster system based on 4G becomes an evolution direction of a wireless dedicated network. In a long term evolution (LTE) system, a user equipment (UE) is configured with radio resource control (RRC)-connected-state discontinuous reception (DRX) and RRC-idle-state DRX. The UE triggers a RRC connection request to a base station in a case that there is data to be received or transmitted by the UE, to enter a RRC connected state. The UE enters a RRC idle state in a case that no data is to be received or transmitted after a while.

In the conventional technology, a DRX cycle includes a deactivation cycle, a short DRX cycle and a long DRX cycle. A deactivation timer is started after the UE completes receiving and transmitting data. The UE enters the short DRX cycle in a case that no data is received or transmitted during timing of the deactivation timer, to be dormant periodically. A transceiver is started in the active cycle to sense whether there is data paging on a physical downlink control channel (PDCCH). The UE enters the long DRX cycle in a case that no data is received and transmitted in multiple short DRX cycles, to be dormant periodically.

In a case that all terminals in the broadband cluster system share a dedicated cluster downlink control channel, generally, only a primary call terminal is in a RRC connected state, and other terminals are in the RRC idle state. The terminal in the RRC idle state has to sense the downlink control channel continuously when performing a group call service, which increases power consumption of the terminal and reduces an effective service time of the terminal.

SUMMARY

A method, a system and a terminal for reducing power consumption of a cluster terminal in a broadband cluster communication system are provided according to the embodiments of the present disclosure, to effectively reduce power consumption of the cluster terminal which performs a group call service in the broadband cluster system.

A method for reducing power consumption of a cluster terminal in a broadband cluster system is provided in a first aspect of the present disclosure, which includes: receiving, by the cluster terminal, a group call configuration instruction transmitted by a base station; configuring a group call context, a discontinuous reception instruction and group call resources by the cluster terminal based on the group call configuration instruction; and executing the discontinuous reception instruction by the cluster terminal; sensing a physical channel by the cluster terminal when it is determined that an active phase of the discontinuous reception instruction is entered; and stopping sensing the physical channel by the cluster terminal when it is determined that a dormant phase of the discontinuous reception instruction is entered.

In conjunction with the first aspect, in a first implementation of the first aspect of the present disclosure, the cluster terminal is a group call terminal in an idle state, and the discontinuous reception instruction is a cluster group call discontinuous reception instruction. The sensing a physical channel by the cluster terminal when it is determined that an active phase of the cluster group call discontinuous reception instruction is entered includes: sensing a group call channel by the cluster terminal when an active phase of the cluster group call discontinuous reception instruction is entered. The stopping sensing the physical channel by the cluster terminal when it is determined that a dormant phase of the cluster group call discontinuous reception instruction is entered includes: turning off a receiver by the cluster terminal to stop sensing the group call channel when a dormant phase of the cluster group call discontinuous reception instruction is entered.

In conjunction with the first aspect, in a second implementation of the first aspect of the present disclosure, the cluster terminal is a group call terminal in a connected state, and the discontinuous reception instruction includes a cluster group call discontinuous reception instruction and a single call discontinuous reception instruction. The sensing a physical channel by the cluster terminal when it is determined that an active phase of the cluster group call discontinuous reception instruction is entered includes: sensing a group call channel by the cluster terminal when an active phase of the cluster group call discontinuous reception instruction is entered and an active phase of the single call discontinuous reception instruction is entered. The stopping sensing the physical channel by the cluster terminal when it is determined that a dormant phase of the cluster group call discontinuous reception instruction is entered includes: turning off a receiver by the cluster terminal to stop sensing the group call channel when it is determined that a dormant phase of the cluster group call discontinuous reception instruction is entered and a dormant phase of the single call discontinuous reception instruction is entered.

In conjunction with the first aspect, in a third implementation of the first aspect of the present disclosure, the cluster terminal is a single call terminal in a connected state, and the discontinuous reception instruction is a single call discontinuous reception. The sensing a physical channel by the cluster terminal when it is determined that an active phase of the cluster group call discontinuous reception instruction is entered includes: sensing a single call channel by the cluster terminal when an active phase of the single call discontinuous reception instruction is entered. The stopping sensing the physical channel by the cluster terminal when it is determined that a dormant phase of the cluster group call discontinuous reception instruction is entered includes: turning off a receiver by the cluster terminal to stop sensing the single call channel when it is determined that a dormant phase of the single call discontinuous reception instruction is entered.

A cluster terminal is provided in a second aspect of the present disclosure, which includes: a configuring module, an executing module and a sensing module. The configuring module is configured to configure a group call context, a discontinuous reception instruction and group call resources based on a received group call configuration instruction transmitted by a base station. The executing module is configured to execute the discontinuous reception instruction configured by the configuring module. The sensing module is configured to sense a physical channel when it is determined that an active phase of the discontinuous reception instruction is entered, and stop sensing the physical channel when it is determined that a dormant phase of the discontinuous reception instruction is entered.

In conjunction with the second aspect, in a first implementation of the second aspect of the present disclosure, the cluster terminal is a group call terminal in an idle state, and the discontinuous reception instruction is a cluster group call discontinuous reception instruction. The sensing module is configured to sense a group call channel when an active phase of the cluster group call discontinuous reception instruction is entered. The executing module is further configured to turn off a receiver to cause the sensing module to stop sensing the group call channel when it is determined that a dormant phase of the cluster group call discontinuous reception instruction is entered.

In conjunction with the second aspect, in a second implementation of the second aspect of the present disclosure, the cluster terminal is a group call terminal in a connected state, and the discontinuous reception instruction includes a cluster group call discontinuous reception instruction and a single call discontinuous reception instruction. The sensing module is further configured to sense a group call channel when an active phase of the cluster group call discontinuous reception instruction is entered and an active phase of the single call discontinuous reception instruction is entered. The executing module is further configured to turn off a receiver to cause the sensing module to stop sensing the group call channel when it is determined that a dormant phase of the cluster group call discontinuous reception instruction is entered and a dormant phase of the single call discontinuous reception instruction is entered.

In conjunction with the second aspect, in a third implementation of the second aspect of the present disclosure, the cluster terminal is a single call terminal in a connected state, and the discontinuous reception instruction is a single call discontinuous reception Instruction. The sensing module is further configured to sense a single call channel when an active phase of the single call discontinuous reception instruction is entered. The executing module is further configured to turn off a receiver to cause the sensing module to stop sensing the single call channel when it is determined that a dormant phase of the single call discontinuous reception instruction is entered.

A cluster terminal is provided in a third aspect of the present disclosure, which includes a receiver and a processor. The receiver is configured to receive a group call configuration instruction transmitted by a base station. The processor is configured to: configure a group call context, a discontinuous reception instruction and group call resources based on the group call configuration instruction received by the receiver from the base station, and execute the discontinuous reception instruction; sense a physical channel when it is determined that an active phase of the discontinuous reception instruction is entered; and stop sensing the physical channel when it is determined that a dormant phase of the discontinuous reception instruction is entered.

In conjunction with the third aspect, in a first implementation of the third aspect of the present disclosure, the cluster terminal is a group call terminal in an idle state, and the discontinuous reception instruction is a cluster group call discontinuous reception instruction. The processor is configured to: sense a group call channel when it is determined that an active phase of the cluster group call discontinuous reception instruction is entered; and turn off a receiver to stop sensing the group call channel when it is determined that a dormant phase of the cluster group call discontinuous reception instruction is entered.

In conjunction with the third aspect, in a second implementation of the third aspect of the present disclosure, the cluster terminal is a group call terminal in a connected state, and the discontinuous reception instruction includes a cluster group call discontinuous reception instruction and a single call discontinuous reception instruction. The processor is configured to: sense a group call channel when it is determined that an active phase of the cluster group call discontinuous reception instruction is entered and an active phase of the single call discontinuous reception instruction is entered; and turn off a receiver to stop sensing the group call channel when it is determined that a dormant phase of the cluster group call discontinuous reception instruction is entered and a dormant phase of the single call discontinuous reception instruction is entered.

In conjunction with the third aspect, in a third implementation of the third aspect of the present disclosure, the cluster terminal is a single call terminal in a connected state, and the discontinuous reception instruction is a single call discontinuous reception instruction. The processor is configured to: sense a single call channel when it is determined that an active phase of the single call discontinuous reception instruction is entered; and turn off a receiver to stop sensing the single call channel when it is determined that a dormant phase of the single call discontinuous reception instruction is entered.

A broadband cluster system is provided in a fourth aspect of the present disclosure, which includes a cluster terminal and a base station. The base station is configured to transmit a group call configuration instruction to the cluster terminal. The cluster terminal is configured to: configure a group call context, a discontinuous reception instruction and group call resources based on the group call instruction, and execute the discontinuous reception instruction; sense a physical channel when it is determined that an active phase of the discontinuous reception instruction is entered; and stop sensing the physical channel when it is determined that a dormant phase of the discontinuous reception instruction is entered.

It can be seen from the above technical solutions that in the present disclosure, upon receiving a group call configuration instruction transmitted by the base station, the cluster terminal configures a discontinuous reception instruction based on the group call configuration instruction and executes the discontinuous reception instruction, the cluster terminal senses a physical channel when it is determined that an active phase of the discontinuous reception instruction is entered, and the cluster terminal stops sensing the physical channel when it is determined that a dormant phase of the discontinuous reception instruction is entered. In this way, discontinuous reception is implemented at the terminal in a broadband cluster system, thereby reducing power consumption of the terminal in a group call service process, and prolonging service time of the cluster terminal.

BRIEF DESCRIPTION OF THE DRAWINGS

In order to illustrate the technical solutions according to the embodiments of the present disclosure more clearly, the drawings required in the embodiments of the present disclosure are introduced simply below. Apparently, the drawings described below show only some of the embodiments of the present disclosure, and other drawings may also be obtained by those skilled in the art without creative work based on the drawings.

DETAILED DESCRIPTION OF THE EMBODIMENTS

Figure 1:
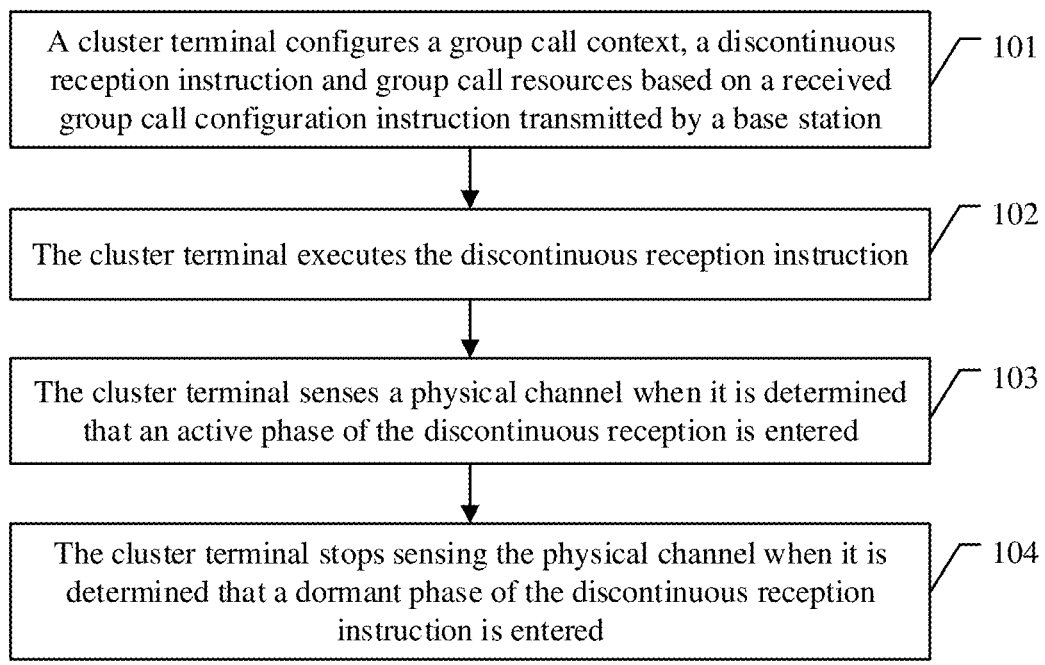
FIG. 1 is a schematic diagram of a method for reducing power consumption of a cluster terminal in a broadband cluster system according to an embodiment of the present disclosure.

In order to make those skilled in the art understand the technical solutions of the present disclosure better, the technical solutions according to the embodiments of the present disclosure are described clearly and completely in conjunction with drawings in the embodiments of the present disclosure. Apparently, the described embodiments are only a part rather than all of the embodiments of the present disclosure. All other embodiments obtained by those skilled in the art without creative work based on the embodiments of the present disclosure fall within the protection scope of the present disclosure.

Terms such as "first" and "second" in the specification, the claims and the above drawings of the present disclosure are used to distinguish similar objects, rather than describe a specific order or a sequential order. It should be understood that data described with the terms may be exchanged in suitable situations, so that the embodiments described here can be embodied in an order other than content shown or described here. In addition, terms such as "include" and "comprise" and any variations thereof are intended to cover non-exclusive "include", for example, a process, a method, a system, a product or a device including a series of steps or units not only includes the steps or units listed clearly, but may also include other steps or units not listed clearly or inherent to the process, the method, the product or the device.

A method, a system and a terminal for reducing power consumption of a cluster terminal in a broadband cluster system are provided according to the embodiments of the present disclosure, which are mainly applied into a broadband cluster communication system, thereby reducing power consumption of the cluster terminal, and prolonging service time of the cluster terminal.

In the conventional technology, generally, only a primary call terminal is in a RRC connected state, and other terminals are in a RRC idle state. The terminal in the RRC idle state has to sense a downlink control channel continuously when performing a group call service, which increases power consumption of the terminal and reduces an effective service time of the terminal. Also, RRC-connected-state discontinuous reception in an LTE system is unable to be applied into a terminal in a RRC idle state in the broadband cluster system, and therefore, power consumption of the terminal in a group call service process cannot be reduced. In view of the technical problems, a method for reducing power consumption of a cluster terminal in a broadband cluster system is provided in the present disclosure, to reduce the power consumption.

It should be illustrated that a PDCCH mentioned herein refers to a dedicated PDCCH, which is only suitable for a dedicated network. Resource allocation indications of an uplink scheduled user and a downlink scheduled user are carried on the PDCCH, resource scheduling or other information of a specific user are carried on the dedicated PDCCH, and are mapped into search space determined by a user-specific radio network temporary identity (RNTI). In addition, the group call service herein refers to a point-to-multipoint call, and one user is allowed to speak on an uplink channel at a time, and other users use a downlink channel. A single call service refers to that a call initiating terminal transmits a single call request to a called terminal via a base station. The call initiating terminal configures a channel assignment message of a service channel, and transmits a paging message to the called terminal. The call initiating terminal and the called terminal performs a single call cluster service, that is, only one party speaks and the other party listens.

A function of an evolved node B (eNB) includes a radio resource management (RRM) function, an IP header compression, user data stream encryption, mobility management entity (MME) selection for attachment of a UE, scheduling transmission of paging information, scheduling transmission of broadcasting information and setting and providing measurement for an eNB.

A method for reducing power consumption of a cluster terminal in a broadband cluster system according to an embodiment of the present disclosure is described in detail below. With reference to FIG. 1, the method according to the embodiment of the present disclosure includes steps 101 to 104.

In step 101, the cluster terminal configures a group call context, a discontinuous reception instruction and group call resources based on received group call instruction transmitted by a base station.

The cluster terminal configures the discontinuous reception DRX while configuring the group call context. The cluster terminal makes resource information related to the received group call context to be available, to subsequently process group call service data transmitted by a base station in the resource information related to the group call context.

Also, the cluster terminal senses a physical channel in a preset cycle. The preset cycle is periodical.

It can be understood that the DRX instruction may be a cluster DRX instruction, or a non-cluster DRX instruction such as a public-network DRX, which is not limited herein.

In addition, the group call context and the group call resources transmitted by the base station are configured by the cluster terminal, so that new group call service data is received in new group air interface resources.

In step 102, the cluster terminal executes the discontinuous reception instruction.

After the discontinuous reception instruction DRX is configured by the cluster terminal, the cluster terminal enables the preset cycle. The preset cycle includes an active phase and a dormant phase, and the preset cycle is periodical.

In step 103, the cluster terminal senses a physical channel when it is determined that the active phase of the discontinuous reception instruction is entered.

In the active phase, a UE senses a physical channel and receives service data in the physical channel. The service data may be a voice service, a video service, a positioning service, a group call service, a single call service or similar services, which is not limited herein.

In step 104, the cluster terminal stops sensing the physical channel when it is determined that the dormant phase of the discontinuous reception instruction is entered.

After a second phase, that is, the dormant phase of the preset cycle is entered, the cluster terminal determines whether there is cluster service data on the physical channel. The cluster terminal turns off a receiver and stops sensing the physical channel in the dormant phase, in a case that there is cluster service data on the physical channel.

In the embodiment of the present disclosure, upon receiving the group call configuration instruction transmitted by the base station, the cluster terminal configures the discontinuous reception instruction based on the group call configuration instruction and executes the discontinuous reception instruction, and senses the physical channel when it is determined that the active phase is entered, and stops sensing the physical channel when it is determined that the dormant phase is entered. In this way, connected-state single call discontinuous reception in a public-network standard is applied to a terminal in a RRC idle state in the broadband cluster system, thereby reducing power consumption of the terminal in a group call service process and prolonging service time of the cluster terminal.

Optionally, in a first optional embodiment of the embodiments of the present disclosure based on the embodiment corresponding to FIG. 1, the cluster terminal is a group call terminal in an idle state, and the discontinuous reception instruction is a cluster group call discontinuous reception instruction. The step that the cluster terminal senses a physical channel when it is determined that an active phase of the discontinuous reception instruction is entered is implemented as a step in which the cluster terminal senses a group call channel when an active phase of the cluster group call discontinuous reception instruction is entered.

The step that the cluster terminal stops sensing the physical channel when it is determined that a dormant phase of the cluster group call discontinuous reception instruction is entered is implemented as a step in which the cluster terminal turns off a receiver to stop sensing the group call channel when a dormant phase of the cluster group call discontinuous reception instruction is entered.

The determining that there is no group call service data on the group call channel is implemented by a step in which the UE senses the group call channel after the dormant phase of the discontinuous reception is entered, and turns off the receiver in a case that there is no service data transmitted on the group call channel, to reduce power consumption.

Optionally, in a second optional embodiment of the embodiments of the present disclosure based on the embodiment corresponding to FIG. 1, the cluster terminal is a group call terminal in a connected state, and the discontinuous reception instruction includes a cluster group call discontinuous reception instruction and a single call discontinuous reception instruction. The step in which the cluster terminal senses a physical channel when it is determined that an active phase of the cluster group call discontinuous reception instruction is entered is implemented as a step in which the cluster terminal senses a group call channel when an active phase of the cluster group call discontinuous reception instruction is entered and an active phase of the single call discontinuous reception instruction is entered.

The step in which the cluster terminal stops sensing the physical channel when it is determined that a dormant phase of the cluster group call discontinuous reception instruction is entered is implemented as a step in which the cluster terminal turns off a receiver to stop sensing the group call channel when it is determined that a dormant phase of the cluster group call discontinuous reception instruction is entered and a dormant phase of the single call discontinuous reception instruction is entered.

It should be illustrated that, a cluster DRX and a public-network DRX may have the same active phase and the same dormant phase, or different active phases and different dormant phases, which are not limited herein. In a case that the cluster DRX and the public-network DRX are activated, the UE is in an active phase if any one of the cluster DRX and the public-network DRX is in an active phase. It can be understood that, in practice, the active phase of the DRX includes both the active phase of the cluster DRX and the active phase of the public-network DRX, which may be understood as a union between the active phase of the cluster DRX and the active phase of the public-network DRX. In addition, the dormant phase of the DRX refers to an overlapped time part between the dormant phase of the cluster DRX and the dormant phase of the public-network DRX, which may be understood as an intersection between the dormant phase of the cluster DRX and the dormant phase of the public-network DRX.

The UE in the RRC connected state is controlled to enter a DRX mode at a UE side or an eNB side.

At the UE side, the UE enter the DRX mode when a timer expires.

At the eNB side, the eNB notifies the UE of entering the DRX mode through a DRX Command MAC control element.

Optionally, in a third optional embodiment of the embodiments of the present disclosure based on the embodiment corresponding to FIG. 1, the cluster terminal is a single call terminal in a connected state, and the discontinuous reception instruction is a single call discontinuous reception instruction. The step that the cluster terminal senses a physical channel when it is determined that an active phase of the cluster group call discontinuous reception instruction is entered is implemented as a step in which the cluster terminal senses a single call channel when an active phase of the single call discontinuous reception instruction is entered.

The step that the cluster terminal stops sensing the physical channel when it is determined that a dormant phase of the cluster group call discontinuous reception instruction is entered is implemented as a step in which the cluster terminal turns off a receiver to stop sensing the single call channel when it is determined that a dormant phase of the single call discontinuous reception instruction is entered.

Figure 2:
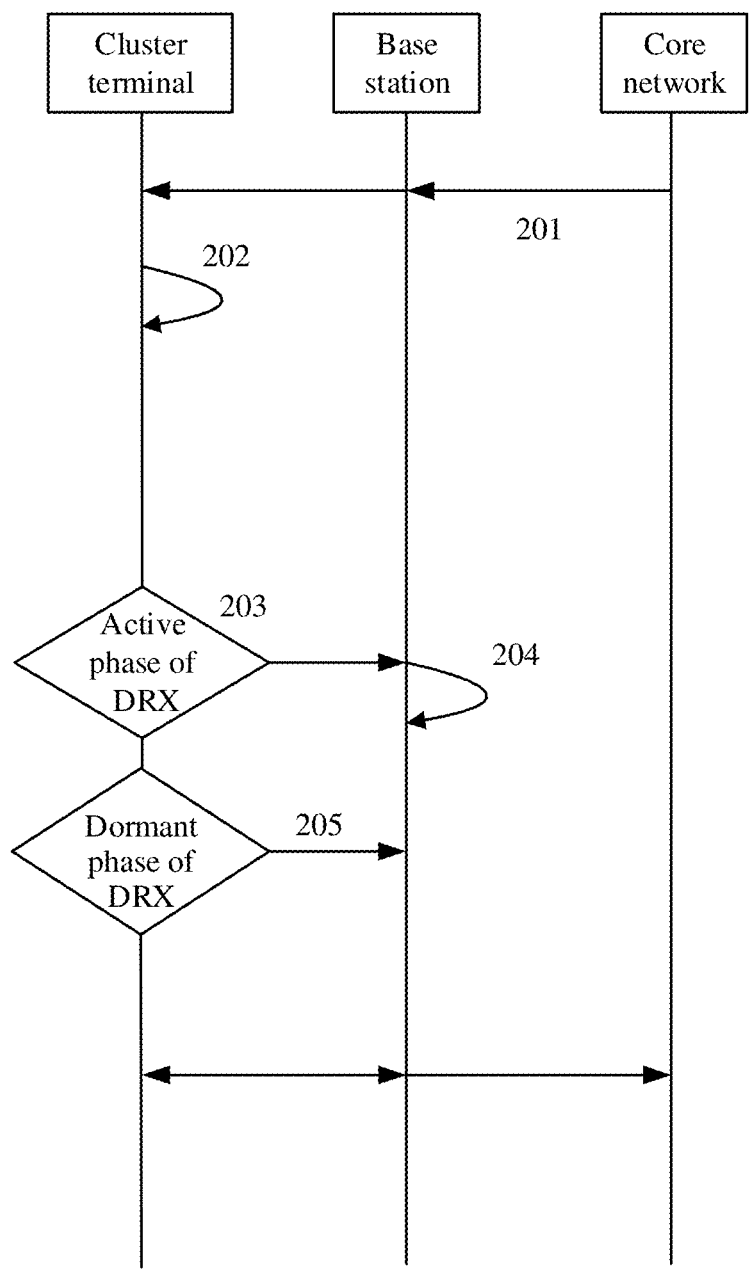
FIG. 2 is a schematic diagram showing a flow of reducing power consumption of a cluster terminal in a RRC idle state according to an embodiment of the present disclosure.

It can be understood that the preset cycle of the DRX is continuous and periodical in the time domain herein. With reference to FIG. 2, drxStartOffset denotes a start frame of a DRX cycle, longDRX-Cycle denotes the number of subframes in one long DRX cycle, and drxStartOffset and longDRX-Cycle are determined by a filed longDRX-Cycle-StartOffset.

An onDurationTimer denotes the number of continuous subframes from the start subframe of the DRX cycle which are used for sensing the PDCCH, that is, the number of continuous subframes in the active phase.

In practice, in a case that a UE is scheduled and receives or transmits data in a certain subframe, the UE may be continued to be scheduled in subsequent several subframes. An extra delay is caused in a case that data is not received or transmitted until a next DRX cycle. In order to reduce the delay, the UE is continued to be in an active phase after being scheduled, that is, the UE is continued to sense the dedicated physical control channel (PDCCH) in the active phase, which is implemented as follows. A timer DRX-InactivityTimer is started (or restarted) every time the UE is scheduled to transmit data initially, and the UE is in an active state until the timer expires. The DRX-inactivityTimer specifies the number of continuous subframes in which the UE is always in the active state after the UE successfully decodes the PDCCH indicating initially-transmitted uplink (UL) or downlink (DL) user data, that is, the timer is restarted every time the UE is scheduled to transmit data initially.

In order to make the UE dormant in a round trip time (RTT) of hybrid automatic request (HARQ), an "HARQ RTT timer" is provided in each DL HARQ process. In a case that a TB in a certain downlink HARQ process fails to be decoded, the UE may assume that retransmission is performed at least after a "HARQ RTT" subframe, therefore, UE is not necessary to sense the PDCCH in a case that the HARQ RTT timer is run. In a case that the HARQ RTT timer expires, and data received in the HARQ process fails to be decoded, the UE starts a DRX-RetransmissionTimer for the HARQ process. In a case that the DRX-RetransmissionTimer is running, the UE senses the PDCCH for HARQ retransmission. The time length of the DRX-RetransmissionTimer is related to flexibility of a scheduler of the eNB. In order to minimize power consumption, the eNB calls the HARQ retransmission immediately after the HARQ RTT timer expires. In this way, radio resources are reserved for the HARQ retransmission by the eNB, and the DRX-RetransmissionTimer may be configured with a short time. The DRX-RetransmissionTimer specifies the maximum number of continuous subframes for sensing the PDCCH from a time when the UE expects to receive a retransmitted DL subframe (after the HARQ RTT).

The DXR cycle is selected while ensuring a balance between battery lifetime and a delay. In an aspect, a long DRX cycle facilitates prolonging a service time of a battery of the UE. For example, in webpage browsing, it is a waste of resources that the UE continues to receive downlink data when the user reads a downloaded webpage. In another aspect, a short DRX cycle facilitates a fast response when new data is transmitted, for example, when a user requests another webpage. Therefore, in practice, each UE may be configured with two DRX cycles, that is, a short DRX-Cycle and a long DRX-Cycle.

Upon receiving a scheduling message in an active phase, the UE starts the "DRX-InactivityTimer" and senses the PDCCH in each subframe during running of the DRX-InactivityTimer. The UE restarts the DRX-InactivityTimer upon receiving scheduling information during running of the DRX-InactivityTimer.

In a case that the DRX-InactivityTimer expires or a DRX Command MAC control element is received, there are two cases: (1) the UE enters a long DRX cycle if the UE is not configured with a short DRX cycle; (2) if the UE is configured with a short DRX cycle, the UE enters the short DRX cycle, and stars or restarts a DRX ShortCycle Timer, and the UE enters a long DRX cycle when the DRX ShortCycle Timer expires.

In a case that the UE is in short DRX-cycle currently, and [(SFN*10)+subframe number] modulo (shortDRX-Cycle)= (drxStartOffset) modulo (shortDRX-Cycle), or in a case that the UE is in the long DRX cycle currently, and [(SFN*10)+ subframe number] modulo (longDRX-Cycle)=drxStartOffset, the "onDurationTimer" is started.

An active time for sensing the PDCCH is the same for all DL component carriers.

All component carriers do not receive service data when the UE is in the dormant phase.

All component carriers are activated when the UE is activated, to receive service data.

The technical solution in the present disclosure is described in detail below by taking a processing flow of reducing power consumption of a cluster terminal in a RRC idle state in the broadband cluster system as an example. With reference to FIG. 2, the processing flow according to the embodiment of the present disclosure includes steps 201 to 205.

In step 201, a cluster terminal in a RRC idle state receives group call configuration instruction transmitted by a core network via a base station.

In step 202, the cluster terminal configures a group call context, cluster DRX and group call resources based on the group call configuration instruction, and activates DRX, so that the DRX is in an active phase.

In step 203, the cluster terminal receives and transmits group call service data and senses a downlink control channel.

In step 204, the base station schedules the group call service data in the active phase of the DRX.

In step 205, the cluster terminal determines whether there is group call service data on the downlink control channel, and turns off a receiver and stops sensing the downlink control channel, after entering a dormant phase of the DRX in a case that there is no group call service data on the downlink control channel.

In the embodiment of the present disclosure, the cluster terminal in the RRC idle state is configured with the cluster DRX, and the cluster terminal senses the downlink control channel when the active phase of the cluster DRX is entered, and stops sensing the downlink control channel when it is determined that the dormant phase of the DRX is entered, thereby reducing power consumption of the cluster terminal in the RRC idle state, and effectively prolonging service time of the cluster terminal.

Figure 3:
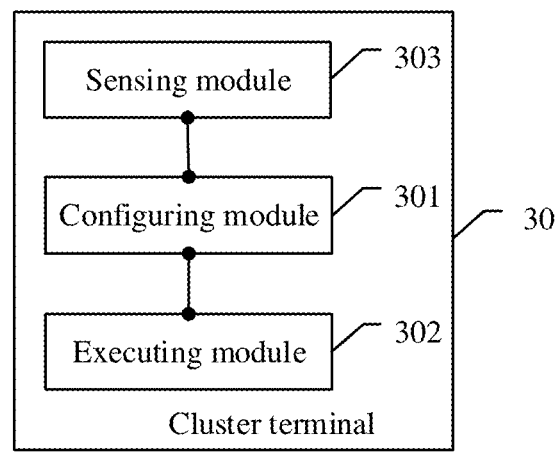
FIG. 3 is a schematic structural diagram of a cluster terminal according to an embodiment of the present disclosure.

The method for reducing power consumption of the cluster terminal in the broadband cluster system according to the embodiment of the present disclosure is described in detail above, and a cluster terminal 30 in the present disclosure is described below. With reference to FIG. 3, the cluster terminal 30 according to the embodiment of the present disclosure includes a configuring module 301, an executing module 302 and a sensing module 303.

The configuring module 301 is configured to configure a group call context, a discontinuous reception instruction and group call resources based on a received group call instruction transmitted by a base station.

The executing module 302 is configured to execute the discontinuous reception instruction.

The sensing module 303 is configured to sense a physical channel when it is determined that an active phase of the discontinuous reception instruction is entered.

The sensing module 303 is further configured to stop sensing the physical channel when it is determined that a dormant phase of the discontinuous reception instruction is entered.

In the embodiment of the present disclosure, upon receiving a group call configuration instruction transmitted by the base station, the configuring module 301 configures a discontinuous reception instruction based on the group call configuration instruction, and then the discontinuous reception instruction is executed. The sensing module 303 senses a physical channel when it is determined that the above active phase is entered. The executing module 303 causes the sensing on the physical channel to be stopped when it is determined that the above dormant phase is entered in a case that there is no cluster service data on the physical channel. In this way, connected-state single call discontinuous reception in a public-network standard is applied to a terminal in a RRC idle state in the broadband cluster system, thereby reducing power consumption of the cluster terminal in a group call service process and prolonging a service time of the cluster terminal.

Optionally, the cluster terminal 30 is a group call terminal in an idle state, and the discontinuous reception instruction is a cluster group call discontinuous reception instruction. The sensing module 303 is configured to sense a group call channel when an active phase of the cluster group call discontinuous reception instruction is entered.

The executing module 302 is further configured to turn off a receiver to cause the sensing module 303 to stop sensing the group call channel when it is determined that a dormant phase of the cluster group call discontinuous reception instruction is entered.

Optionally, the cluster terminal 30 is a group call terminal in a connected state, and the discontinuous reception instruction includes a cluster discontinuous reception instruction and a single call discontinuous reception instruction. The sensing module 303 is further configured to sense a group call channel when an active phase of the cluster group call discontinuous reception instruction is entered and an active phase of the single call discontinuous reception instruction is entered.

The executing module 302 is further configured to turn off a receiver to cause the sensing module 303 to stop sensing the group call channel when it is determined that a dormant phase of the cluster group call discontinuous reception instruction is entered and a dormant phase of the single call discontinuous reception instruction is entered.

Optionally, the cluster terminal 30 is a single call terminal in a connected state, and the discontinuous reception instruction is a public-network discontinuous reception instruction. The sensing module 303 is further configured to sense a single call channel when an active phase of the single call discontinuous reception instruction is entered.

The executing module 302 is further configured to turn off a receiver to cause the sensing module 303 to stop sensing the single call channel when it is determined that a dormant phase of the single call discontinuous reception instruction is entered.

Figure 4:
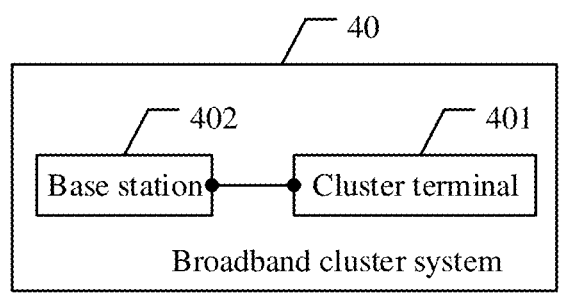
FIG. 4 is a schematic structural diagram of a broadband cluster system according to an embodiment of the present disclosure.

With reference to FIG. 4, a broadband cluster system according to an embodiment of the present disclosure includes a cluster terminal 401 and a base station 402.

The base station 402 is configured to transmit a group call configuration instruction to the cluster terminal 401.

The cluster terminal 401 is configured to configure a group call context, a discontinuous reception instruction and group call resources based on the group call configuration instruction, and execute the discontinuous reception instruction.

The cluster terminal 401 senses a physical channel when it is determined that an active phase of the discontinuous reception instruction is entered.

The cluster terminal 401 stops sensing the physical channel when it is determined that a dormant phase of the discontinuous reception instruction is entered.

In the embodiment of the present disclosure, the cluster terminal 401 configures the discontinuous reception instruction based on the group call configuration instruction transmitted by the base station 402, makes the discontinuous reception instruction to be available, senses the physical channel in an active phase of the discontinuous reception instruction, and stops sensing the physical channel in a dormant phase of the discontinuous reception instruction, thereby reducing power consumption of the cluster terminal 401, and effectively prolonging a service time of the cluster terminal 401.

A computer storage medium is further provided in the present disclosure, a program is stored in the computer storage medium, and the program includes a part or all of steps in the method for reducing power consumption of the cluster terminal in the broadband cluster system described above when being executed.

A computer storage medium is further provided in the present disclosure, a program is stored in the computer storage medium, and a cluster terminal executes a part or all of steps in the method for reducing power consumption of the cluster terminal in the broadband cluster system when the program is executed.

Figure 5:
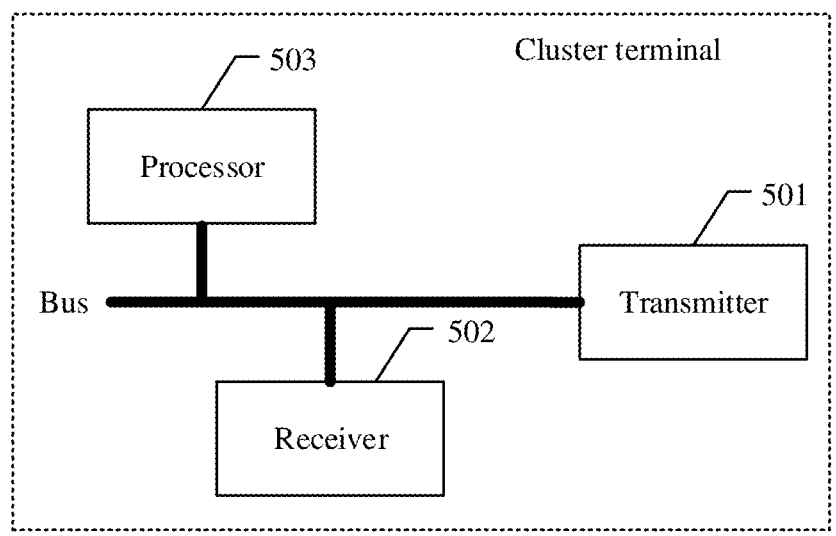
FIG. 5 is a schematic structural diagram of a physical device of a cluster terminal according to an embodiment of the present disclosure.

FIG. 5 is another schematic structural diagram of a user equipment 50 according to an embodiment of the present disclosure. The user equipment 50 may include at least one network interface or other communication interface, at least one receiver 501, at least one transmitter 502, at least one processor 503 and a storage 504. In order to implement communication connection between the components, a gateway of the system is communicatively connected to at least one other network element via at least one network interface (which may be a wired or wireless interface). The Internet, a wide area network, a local network, a metropolitan area network and the like may be used.

The storage 504 may include a read-only memory and a random-access memory, and provides instructions and data to the processor 503. The storage 504 may be partially a high-speed random access memory (RAM), or a non-volatile memory.

An executable module or a data structure, or a subset of the executable module and the data structure, or a set of extensions of the executable module and the data structure, operating instructions and various operating systems are stored in the storage 504.

The operating instructions are used for implementing various operations.

The operating systems are used for implementing various basic services and processing tasks based on hardware.

In the embodiment of the present disclosure, by calling operating instructions (which may be stored in the operating systems) stored in the storage 504, the processor 503 executes operations as follows: configuring a group call context, a discontinuous reception instruction and group call resources based on the group call configuration instruction received by the receiver 501 from a base station; executing the discontinuous reception instruction; sensing a physical channel when it is determined that an active phase of the discontinuous reception instruction is entered; and stopping sensing the physical channel when it is determined that a dormant phase of the discontinuous reception instruction is entered.

In some embodiments, the cluster terminal 50 is a group call terminal in an idle state, and the discontinuous reception instruction is a cluster group call discontinuous reception instruction, the processor 503 described above may further execute operations as follows: sensing a group call channel when an active phase of the cluster group call discontinuous reception instruction is entered; turning off a receiver to stop sensing the group call channel when a dormant phase of the cluster group call discontinuous reception instruction is entered In some embodiments, the cluster terminal 50 is a group call terminal in a connected state, and the discontinuous reception instruction includes a cluster group call discontinuous reception instruction and a single call discontinuous reception instruction. The processor 503 described above may further execute operations as follows: sensing a group call channel when an active phase of the cluster group call discontinuous reception instruction is entered and an active phase of the single call discontinuous reception instruction is entered; and turning off a receiver to stop sensing the group call channel when it is determined that a dormant phase of the cluster group call discontinuous reception instruction is entered and a dormant phase of the single call discontinuous reception instruction is entered.

In some embodiments, the cluster terminal 50 is a single call cluster terminal in a connected state, and the discontinuous reception instruction is a single call discontinuous reception instruction. The processor 503 described above may further execute operations as follows: sensing a single call channel when an active phase of the single call discontinuous reception instruction is entered; and turning off a receiver to stop sensing the single call channel when it is determined that a dormant phase of the single call discontinuous reception instruction is entered.

In the above embodiments, each of the embodiments has its own focus in description, and a part which is not described in detail in an embodiment may refer to related description in other embodiment.

It may be clearly known by those skilled in the art that for convenience and conciseness of description, operating processes of the system, the device and the unit described above are not described repeatedly here, and one may refer to corresponding processes in the method embodiments described above for details.

It should be understood that, according to the embodiments of the present disclosure, the disclosed system, apparatus and methods may be implemented in other ways. For example, the described apparatus embodiment is merely for illustration. For example, the units are divided merely based on logical functions, and the units may be divided with other division manner in practice. For example, multiple units or modules may be combined, or may be integrated into another system, or some features may be omitted or not be implemented. In addition, the displayed or discussed couplings, direct couplings or communication connections may be implemented as indirect couplings or communication connections via some interfaces, devices or units, which may be electrical, mechanical or in other forms.

The units described as separate components may be or not be separated physically. The components shown as units may be or not be physical units, i.e., the units may be located at one place or may be distributed onto multiple network units. All of or part of the units may be selected based on actual needs to implement the solutions according to the embodiments.

In addition, function units according to the embodiments of the present disclosure may be integrated in one processing unit, or the units may exist separately, or two or more units may be integrated in one unit. The integrated unit may be implemented in a form of hardware or a software function unit.

If the integrated units are implemented in the form of software function unit and the software function unit is sold or used as separate products, the software function unit may also be stored in a computer readable storage medium. Based on such understanding, an essential part of the technical solutions of the present disclosure, i.e., the part of the technical solutions of the present disclosure that contribute to the existing technology, or all or a part of the technical solutions may be embodied in the form of a computer software product. The computer software product is stored in a storage medium, and includes several instructions for instructing a computer device (which may be a personal computer, a server, a network device or the like) to implement all or a part of the steps of the methods according to the embodiments of the present disclosure. The foregoing storage medium includes various media that can store program codes, for example, a USB disk, a mobile hard disk, a read-only memory (ROM), a random access memory (RAM), a magnetic disk, an optical disk.

The method, the terminal and the system for reducing power consumption of the cluster terminal in the broadband cluster system in the present disclosure are described above in detail, and changes may be made onto the embodiments and an application scope by those skilled in the art based on concepts in the embodiments of the present disclosure. To sum up, the specifications should not be regarded as a limit for the present disclosure.

The invention claimed is:

1. A method for reducing power consumption of a cluster terminal in a broadband cluster system, comprising:
   receiving, by the cluster terminal, a group call configuration instruction transmitted by a base station; configuring a group call context, a discontinuous reception instruction and group call resources by the cluster terminal based on the group call configuration instruction; and executing the discontinuous reception instruction by the cluster terminal;
   sensing a physical channel by the cluster terminal when it is determined that an active phase of the discontinuous reception instruction is entered; and
   stopping sensing the physical channel by the cluster terminal when it is determined that a dormant phase of the discontinuous reception instruction is entered,
   wherein the cluster terminal is a group call terminal in a connected state, and the discontinuous reception instruction comprises a cluster group call discontinuous reception instruction and a single call discontinuous reception instruction,
   the sensing a physical channel by the cluster terminal when it is determined that an active phase of the discontinuous reception instruction is entered comprises: sensing a group call channel by the cluster terminal when an active phase of the cluster group call discontinuous reception instruction is entered and an active phase of the single call discontinuous reception instruction is entered, and the stopping sensing the physical channel by the cluster terminal when it is determined that a dormant phase of the discontinuous reception instruction is entered comprises: turning off a receiver by the cluster terminal to stop sensing the group call channel when it is determined that a dormant phase of the cluster group call discontinuous reception instruction is entered and a dormant phase of the single call discontinuous reception instruction is entered; or wherein the cluster terminal is a single call terminal in a connected state, and the discontinuous reception instruction is a single call discontinuous reception instruction, the sensing a physical channel by the cluster terminal when it is determined that an active phase of the discontinuous reception instruction is entered comprises: sensing a single call channel by the cluster terminal when an active phase of the single call discontinuous reception instruction is entered, and the stopping sensing the physical channel by the cluster terminal when it is determined that a dormant phase of the discontinuous reception instruction is entered comprises: turning off a receiver by the cluster terminal to stop sensing the single call channel when it is determined that a dormant phase of the single call discontinuous reception instruction is entered.

2. A cluster terminal, comprising:

a configuring module configured to configure a group call context, a discontinuous reception instruction and group call resources based on a received group call configuration instruction transmitted by a base station;

an executing module configured to execute the discontinuous reception instruction configured by the configuring module; and a sensing module configured to sense a physical channel when it is determined that an active phase of the discontinuous reception instruction is entered, and stop sensing the physical channel when it is determined that a dormant phase of the discontinuous reception instruction is entered, wherein the cluster terminal is a group call terminal in a connected state, and the discontinuous reception instruction comprises a cluster group call discontinuous reception instruction and a single call discontinuous reception instruction, the sensing module is further configured to sense a group call channel when an active phase of the cluster group call discontinuous reception instruction is entered and an active phase of the single call discontinuous reception instruction is entered, and the executing module is further configured to turn off a receiver to cause the sensing module to stop sensing the group call channel when it is determined that a dormant phase of the cluster group call discontinuous reception instruction is entered and a dormant phase of the single call discontinuous reception instruction is entered; or wherein the cluster terminal is a single call terminal in a connected state, and the discontinuous reception instruction is a single call discontinuous reception instruction, the sensing module is further configured to sense a single call channel when an active phase of the single call discontinuous reception instruction is entered, and the executing module is further configured to turn off a receiver to cause the sensing module to stop sensing the single call channel when it is determined that a dormant phase of the single call discontinuous reception instruction is entered.

3. A cluster terminal, comprising:

a receiver configured to receive a group call configuration instruction transmitted by a base station; and a processor configured to:

configure a group call context, a discontinuous reception instruction and group call resources based on the group call configuration instruction received by the receiver from the base station, and execute the discontinuous reception instruction;

sense a physical channel when it is determined that an active phase of the discontinuous reception instruction is entered; and stop sensing the physical channel when it is determined that a dormant phase of the discontinuous reception instruction is entered, wherein the cluster terminal is a group call terminal in a connected state, and the discontinuous reception instruction comprises a cluster group call discontinuous reception instruction and a single call discontinuous reception instruction, the processor is configured to:

sense a group call channel when it is determined that an active phase of the cluster group call discontinuous reception instruction is entered and an active phase of the single call discontinuous reception instruction is entered, and turn off a receiver to stop sensing the group call channel when it is determined that a-dormant phase of the cluster group call discontinuous reception instruction is entered and a dormant phase of the single call discontinuous reception instruction is entered; or wherein the cluster terminal is a single call terminal in a connected state, and the discontinuous reception instruction is a single call discontinuous reception instruction, the processor is configured to:

sense a single call channel when it is determined that an active phase of the single call discontinuous reception instruction is entered, and turn off a receiver to stop sensing the single call channel when it is determined that a dormant phase of the single call discontinuous reception instruction is entered.

* * * * *